Sept. 10, 1940.  J. E. HAINES  2,214,554
HEAT SYSTEM
Filed April 15, 1935
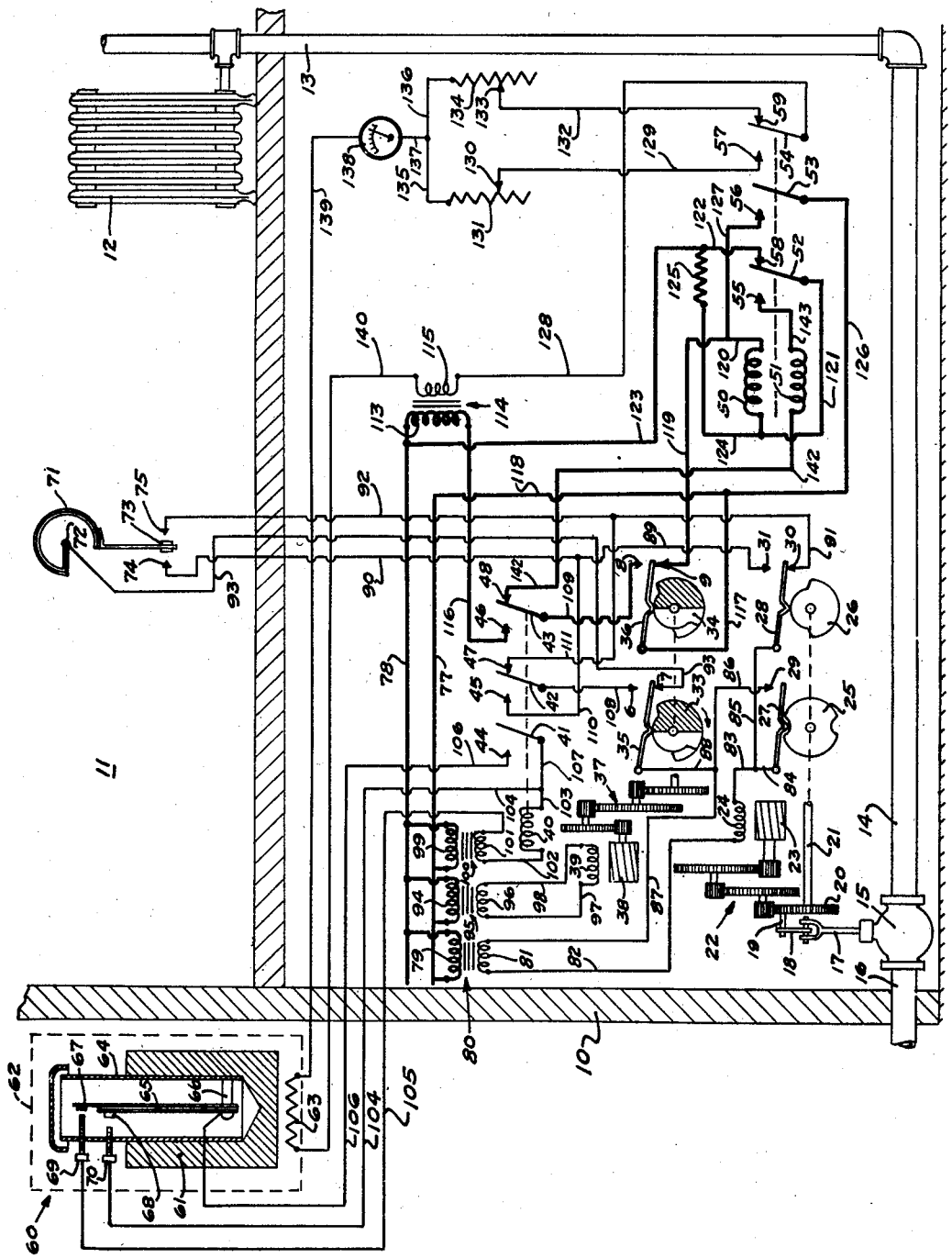
INVENTOR
John E. Haines
BY HIS ATTORNEY
George H. Fisher Patented Sept. 10, 1940

2,214,554

UNITED STATES PATENT OFFICE 2,214,554

HEAT SYSTEM

John E. Haines, Minneapolis, Minn., assignor to Minneapolis-Honeywell Regulator Company, Minneapolis, Minn., a corporation of Delaware Application April 15, 1935, Serial No. 16,277

14 Claims. (Cl. 236—91)

This invention relates to heating a heating system of the type disclosed in the application of Daniel G. Taylor, S. N. 512,887, filed February 2, 1931, Patent No. 2,065,835, Dec. 29, 1936.

The system disclosed in the above referred to Taylor application comprises an outdoor controller responsive to outdoor atmospheric conditions including temperature, wind and sun for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outside controller. Due to the proportional relationship of the heating means with the heat losses of the building and the outside controller, a definite temperature relation is maintained within the building and the outside controller so that by responding to the temperature of the outside controller, the thermostatic device maintains a constant or normal temperature within the building.

Such a system gives excellent results when the system is maintained in operation for twenty-four hours a day. However, it is often desirable to shut down the heating system during the night to lower the temperature within the building to conserve on fuel costs. But due to the fundamental theory of operation, the system of the Taylor application cannot supply sufficient heat to the building in the morning after a night shut down to rapidly raise the temperature to normal and thereafter maintain the temperature in the building at normal. This is caused by the fact that only sufficient heat is supplied to the building to maintain the temperature thereof constant according to variations in outside atmospheric conditions. In order to successfully operate the system of the type disclosed in the above referred to Taylor application where it is desired to have a night shut down it is necessary that some means be provided for raising the temperature in the building to normal after a night shut down.

Therefore, it is an object of this invention to provide a morning pick-up control of the heating system whereby the building temperature is brought up to normal so that the temperature of the building may be maintained at normal by the outdoor controller.

More specifically it is an object of this invention to provide a morning pick-up control of the heating system whereby the building temperature is brought up to normal in accordance with outdoor atmospheric conditions and to provide a normal day control of the heating system whereby door atmospheric conditions and to provide a normal in accordance with outdoor atmospheric conditions.

Another object of this invention is to provide an outdoor controller for controlling the temperature changing means of a building to maintain a normal temperature within the building and means to adjust the outdoor controller to restore the building temperature to normal in accordance with outdoor atmospheric conditions following a shut-down of the system.

Another object of this invention is to provide heating means for a building, an outdoor controller comprising heating means for heating the same and thermostatic means responsive to the temperature of the same, the thermostatic means controlling both heating means and the controller heating means being adapted to supply different amounts of heat to the controller, and means controlling the controller heating means to supply one amount of heat to the controller to raise the building temperature to normal and to supply another amount of heat to the controller to maintain the building temperature at normal.

Other objects and advantages will become apparent to those skilled in the art upon referring to the accompanying specification, claims and drawing in which drawing is diagrammatically illustrated the preferred form of my invention as applied to a building having a side wall 10 and a plurality of spaces to be heated, one of the spaces being shown at 11.

Located in the spaces to be heated 11 are radiators 12 which are connected to risers 13. The risers 13 are connected to a pipe 14 which in turn is connected to a valve 15. The valve 15 controls the supply of steam or other heating fluid from a supply pipe 16 which leads from some source of steam (not shown). When the valve 15 is moved to the open position, steam is supplied from the supply pipe 16 through the pipe 14 and the risers 13 to the radiators 12 to heat the spaces 11 within the building.

The valve 15 is operated by a valve stem 17 which is connected to a pitman 18 which in turn is journaled on a crank pin 19. A gear 20 mounted on a shaft 21 carries the crank pin 19. The gear 20 and the shaft 21 are rotated through a reduction gear train 22 by a motor rotor 23 upon energization of a field 24. The shaft 21 also carries cams 25 and 26 which operate contact arms 27 and 28. The contact arm 27 is adapted to engage at times a contact 29 and the contact arm 28 is adapted to alternately engage contacts 30 and 31.

This invention contemplates the use of a time switch, comprising adjustable cams 33 and 34 for operating contact arms 35 and 36. The contact arm 35 is moved into engagement with either contact 6 or 7 and the contact arm 36 is likewise alternately moved into engagement with contacts 8 or 9. The cams 33 and 34 are driven through a reduction gear train 37 by a motor rotor 38 upon energization of the motor field 39. The gear train 37 is so proportioned that the cams 33 and 34 are rotated once during every 24 hours. For purposes of clearness, one-half of the cams 33 and 34 are shaded to denote the night portions and the remaining parts of the cams 33 and 34 are left clear to show the day portions thereof. The cams are rotated in the direction shown by the arrows. As seen in the drawing, the cams are in a position corresponding to midnight and that the contact arms 35 and 36 will be moved into engagement with the contacts 6 and 8 respectively at substantially 6 o'clock in the morning and move into engagement with the contacts 7 and 9 at substantially 9 o'clock in the evening. The cams may be adjusted to give any desired timing operation.

A relay coil is designated at 40 and upon energization thereof, switch arms 41, 42 and 43 are moved into engagement with contacts 44, 45 and 46, respectively. Upon deenergization of the relay coil 40 the switch arms will move out of the engagement with contacts 44, 45 and 46 and the switch arms 42 and 43 will move into engagement with the contacts 47 and 48. This latter motion of the switch arms, upon deenergization of the relay coil 40, is affected by springs, gravity or some other means, not shown.

Another relay is shown at the lower right hand portion of the drawing and comprises an energizing coil 50 and a bucking coil 51. Upon energization of the energizing coil 50, switch arms 52, 53 and 54 are moved into engagement with contacts 55, 56 and 57. Upon deenergization of the energizing coil 50 the switch arms 52, 53 and 54 are moved out of engagement with the contacts 55, 56 and 57 and the switch arms 52 and 54 are moved into engagement with the contacts 58 and 59, respectively. This latter movement is caused by springs, gravity or some other means, not shown. Likewise, upon energization of the bucking coil 51, when the energizing coil 50 is energized, the bucking coil 51 will neutralize the holding effect of the energizing coil 50 and the switch arms 52, 53 and 54 will be moved to the right.

Located on the outside of the building is an outdoor controller 60 which comprises a metallic block 61 enclosed within a weather-tight casing 62. A heater 63 is located in close proximity to the metallic block 61 so that upon energization of the heater 63 the block 61 is heated and upon deenergization of the heater 63 the block 61 is cooled by the outdoor atmosphere. The block 61 is hollowed out and is adapted to receive a container 64 in which is mounted a bimetallic element 65 by means of a post 66. The bimetallic element 65 responds to the temperature of the metallic block 61 and carries contacts 67 and 68 which are adapted to sequentially engage adjustable contacts 69 and 70. As in the above referred to application, the outdoor controller 60 responds to atmospheric conditions including temperature, wind and solar radiation.

Located in one of the spaces to be heated 11, is a room thermostat 71 which is mounted on a post 72. The room thermostat 71 carries contacts 73 which are adapted to alternately engage contacts 74 and 75.

Line wires leading from some source of power, not shown, are designated at 77 and 78. Across these line wires is connected a primary 79 of a step-down transformer 80 provided with a secondary 81. One end of the secondary 81 is connected by means of a wire 82 to one end of the field 24. The other end of the field 24 is connected by means of wires 83 and 84 to the contact arm 27. A wire 85 connects the contact arm 28 to the junction of the wires 83 and 84. Wires 86 and 87 connect the contact 29 with the other end of the secondary 81. A wire 88 connects the contact arm 35 of the time switch with the junction of wires 86 and 87. The contact 31 is connected by means of wires 89 and 90 to the contact 74 of the inside thermostat 71 and the contact 30 is connected by means of wires 91 and 92 to the contact 75 of the inside thermostat 71. The post 72 of the inside thermostat 71 is connected by means of a wire 93 to the contact 7 of the time switch. The inside thermostat 71 is so adjusted as to maintain a minimum night temperature, say 60°, within the building.

With the parts in the position shown in the drawing, say midnight, the valve 15 is opened and heat is being supplied to the building to maintain the predetermined night temperature within the building. When the temperature within the building rises above the predetermined night temperature, the thermostat 71 moves the contact 73 into engagement with the contact 75 to complete a circuit from the secondary 81 of the step-down transformer 80 through wires 87 and 88, contact arm 35, contact 7, wire 93, post 72, thermostat 71, contacts 73 and 75, wires 92 and 91, contact 30, contact arm 28, wires 85 and 83, field 24 and wire 82 back to the secondary 81. Upon completion of this circuit, the field 24 is energized to start the valve 15 in its movement towards its closed position. After the valve 15 has started to move towards its closed position, the contact arm 27 is moved into engagement with the contact 29 to complete a maintaining circuit from the secondary 81 through wires 87 and 86, contact 29, contact arm 27, wires 84 and 83, field 24 and wire 82 back to the secondary 81. This maintaining circuit will remain completed until the contact arm 27 is moved out of engagement with contact 29 at which time the valve 15 will be completely closed to prevent the further supply of heating fluid to the building. Also during the closing movement of the valve 15 the contact arm 28 is moved into engagement with the contact 31 to position the parts for opening movement of the valve.

When the night temperature within the building falls below the predetermined night temperature setting the thermostat 71 moves the contact 73 into engagement with the contact 74 to complete a circuit from the secondary 81 through wires 87 and 88, contact arm 35, contact 7, wire 93, post 72, thermostat 71, contacts 73 and 74, wires 90 and 89, contact 31, contact arm 28, wires 85 and 83, field 24 and wire 82 back to the secondary 81. Completion of this circuit energizes the motor to move the valve 15 towards an open position and the valve 15 is completely moved to the opened position by the above referred to maintaining circuit through the contact arm 27. When the valve 15 has been moved to the open position, contact arm 28 is brought into engagement with the contact 30 to position the parts for closing movement of the valve upon an increase in temperature within the building.

From the above it is seen that I have provided a means for maintaining the night temperature within a building at a given value. This temperature value may be varied to meet the circumstances by adjusting the setting of the thermostat 71.

A primary 94 of a step-down transformer 95 is connected across the line wires 77 and 78. One end of the secondary 96 of the transformer 95 is connected by means of a wire 97 to one end of the field 39. The other end of the secondary 96 is connected by means of a wire 98 to the other end of the field 39, whereby the field 39 is maintained energized at all times to operate the time switch in such a manner that the cams 33 and 34 are rotated once in twenty-four hours.

A primary 99 of a step-down transformer 100, having a secondary 101, is connected across the line wires 77 and 78. One end of the secondary 101 is connected by means of a wire 102 to one end of the relay coil 40. The other end of the relay coil 40 is connected by means of wires 103 and 104 to the contact 70 of the outdoor controller 60. Contact 69 is connected by means of a wire 105 to the other end of the secondary 101. The post 66 of the outdoor controller is connected by means of wire 106 to the contact 44. The wire 107 connects the switch arm 41 to the junction of wires 103 and 104.

Upon a decrease in temperature of the block 61 in the outdoor controller 60, the bimetallic element 65 moves the contact 67 into engagement with the contact 69. Upon the further decrease in block temperature, the contact 68 is moved into engagement with the contact 70 to complete a circuit from the secondary 101 through wire 105, contacts 69, 67, 68 and 70, wires 104 and 103, relay coil 40 and wire 102 back to the secondary 101. Completion of this circuit causes energization of the relay coil 40 to move the switch arms 41, 42, and 43 into engagement with the contacts 44, 45 and 46. Upon engagement of the switch arm 41 with the contact 44, a second or holding circuit is completed from the secondary 101 through wire 105, contact 69 and 67, bimetallic element 65, post 66, wire 106 contact 44, switch arm 41, wires 107 and 103, relay coil 40 and wire 102 back to the secondary 101. The relay coil 40 remains energized until contact between the contacts 67 and 69 is broken at which time the relay drops out and the switch arms 41, 42 and 43 move out of engagement with the contacts 44, 45 and 46. From this it is seen that when the temperature of the block 61 falls below a predetermined value the relay coil 40 is energized to pull in the relay and when the block temperature rises above a predetermined higher value the relay coil 40 is deenergized to allow the relay to fall out.

The switch arm 42 of the relay is connected by means of a wire 108 to the contact 6 of the time switch and the switch arm 43 is connected by means of a wire 109 to the contact 8. The contact 45 of the relay is connected by means of a wire 110 to the junction of wires 89 and 90 and the contact 47 is connected by means of a wire 111 to the junction of wires 91 and 92. From this it is seen that the contacts 45 and 47 are connected in parallel to the contacts 74 and 75 of the inside thermostat 71.

Assume that the valve 15 is closed, that the temperature of the block 61 is at a low value to energize the relay coil 40 and that the time is 6 a. m., the contact arm 28 will be in engagement with the contact 31, the switch arm 42 will engage the contact 45 and the conact arm 35 will be moved into engagement with the contact 6. When the parts are in this position a circuit is completed from the secondary 81 through wires 87 and 88, contact arm 35, contact 6, wire 108, switch arm 42, contact 45, wires 110 and 89, contact 31, contact arm 28, wires 85 and 83, field 24 and wire 82 back to the secondary 81. Completion of this circuit causes the valve 15 to be moved to its open position to supply heat to the building. When the temperature of the block 61 rises above a predetermined value to deenergize the relay coil 40, the switch arm 42 is moved out of engagement with the contact 45 and into engagement with contact 47 to complete a circuit from secondary 81, through wires 87 and 88, contact arm 35, contact 6, wire 108, switch arm 42, contact 47, wires 111 and 91, contact 30, contact arm 28, wires 85 and 83, field 24 and wire 82 back to the secondary 81. Completion of this circuit causes closing movement of the valve 15. From this it is seen that during the daytime the inside thermostat 71 is thrown out of operation and the oudoor controller 60 is thrown into operation and when the temperature of block 61 is relatively cool the valve 15 is moved to an open position and when the temperature of the block 61 is relatively warm, the valve 15 is moved to a closed position.

One end of a primary 113 of a step-down transformer 114 having a secondary 115 is connected to the line wire 78. The other end of the primary 113 is connected by means of a wire 116 to the contact 46. The contact arm 36 of the time switch is connected by means of wires 117 and 118 to the line wire 77.

During the daytime, contact arm 36 is maintained in engagement with the contact 8 and when the temperature of the block 61 of the outdoor controller 60 is below a predetermined value, the switch arm 43 is moved into engagement with contact 46 to complete a circuit from the line wire 78 through the primary 113, wire 116, contact 46, switch arm 43, wire 109, contact 8, contact arm 36 and wires 117 and 118 back to the line wire 77 to supply power to the secondary 115. It will be seen that when the temperature of the block 61 is above the predetermined value to deenergize the relay coil 40 or when the contact arm 36 is out of engagement with the contact 8, as during the nighttime, the above circuit is broken to prevent the supply of power to the secondary 115.

The contact 9 of the time switch is connected by means of wires 119 and 120 to one end of the energizing coil 50. The other end of the energizing coil 50 is connected by means of a wire 121 to the switch arm 52. The contact 58, which is engaged by the switch arm 52, is connected by means of wires 122 and 123 to the line wire 78. The energizing coil 50 is also connected by means of a wire 124 and a resistance 125 to the junction of wires 122 and 123. The contact 56 is connected by means of a wire 127 to the junction of wires 119 and 120.

At substantially 9 o'clock at night the contact arm 36 is moved into engagement with the contact 9 to complete a circuit from the line wire 77 through wires 118 and 117, contact arm 36, contact 9, wires 119 and 120, energizing coil 50, wire 124, resistance 125, and wire 123 to line wire 78 to cause energization of the energizing coil 50. Also, a shunt circuit from the left end of coil 50 around the resistance 125 will be established through wire 121, switch arm 52, contact 58, and wire 122. This shunt circuit will insure sufficient energization of energizing coil 50 to cause initial movement of the relay. After this initial movement, switch arm 52 will disengage contact 58 thereby breaking this shunt circuit, and completion of the pull-in movement of the relay will be caused by the energizing circuit through resistance 125. Upon completion of this movement, a holding circuit is completed from the line wire 77 through wires 118 and 126, switch arm 53, contact 56, wires 127 and 120, energizing coil 50, wire 124, resistance 125 and wire 123, back to the line wire 78. By reason of this holding circuit the energizing coil 50 is maintained energized regardless of the position of the contact arm 36 of the time switch, to hold the switch arms 52, 53 and 54 in engagement with the contacts 55, 56 and 57. The resistance 125 is inserted in this holding circuit to decrease the temperature within the energizing coil 50.

One end of the secondary 115 is connected by means of a wire 128 to the switch arm 54. The contact 57 is connected by means of a wire 129 to a slider 130 engaging a resistance 131 and the contact 59 is likewise connected by means of a wire 132 to a slider 133 engaging a resistance 134. The resistances 131 and 134 are connected together and to a wire 137 by means of wires 135 and 136. The wire 137 is connected to an ammeter 138, the ammeter 138 is in turn connected by means of a wire 139 to one end of the heater 63 of the outside controller 60. The other end of the heater 63 is connected by means of a wire 140 to the other end of the secondary 115 of the step-down transformer 114.

The resistances 131 and 134 are adjustable to determine the correct amount of energy supplied to the heater 63 and consequently the amount of heat delivered to the block 61. The resistance 134 controls the supply of heat to the block 61 during the daytime and the resistance 131 controls the supply of heat to the block 61 during the morning pick-up period. When the secondary 115 of the step-down transformer 114 receives power in the above identified manner and when the switch arm 54 is in engagement with the contact 59, heat is supplied to the block 61 for day operation and when the switch arm 54 is moved into engagement with the contact 57 heat is supplied to the block 61 for the morning pick-up period. As pointed out above and in the above referred to application, the amount of heat delivered to the block 61 during the day is proportioned to the amount of heat delivered to the building as the heat loss of the block is to the heat loss of the building to maintain the temperature within the building at a constant normal value. The amount of heat so delivered to the block 61 during the day is adjusted by the variable resistance 134.

However, during night operation the outdoor controller 60 is rendered inoperative and the temperatures of the building and of the outdoor controller are allowed to drop. The temperature of the controller will drop farther than the temperature of the building during this shut-off night period. In order to bring the temperature of the building and of the outdoor controller back up to normal during the morning pick-up to place the system in condition for normal day operation, a definite amount of heat must be supplied to the outdoor controller. Assume that the temperature of the building drops to, say 60° and that of the outdoor controller drops to say 20° at night and that a normal average temperature of 70° is to be maintained in the building and in the controller during the daytime. The amounts of heat delivered to the controller and to the building should be so proportioned that when the heating system is turned on in the morning for the morning pick-up period the temperature of the building and the temperature of the outdoor controller should reach their normal day values at substantially the same time. In order to set up and maintain this proportion of heat, the variable resistance of 131 is provided for the morning pick-up cycle. The proper amount of heat delivered to the outdoor controller during this morning pick-up cycle may vary with conditions such as the amount of radiation in the building, the heat losses from the building and controller, and the capacity of the building and the controller to hold heat. By trial on each particular installation the correct setting of the variable resistance 131 may be obtained.

Contact 48 is connected by means of a wire 142 to one end of the bucking coil 51. The other end of the bucking coil 51 is connected by means of a wire 143 to the contact 55. In the morning at substantially 6 o'clock the contact arm 36 is moved into engagement with the contact 8 and when the temperature of the block 61 has risen to a predetermined value to deenergize the relay coil 40, the switch arm 43 is moved into engagement with the contact 48 to complete a circuit from the line wire 77 through wires 118 and 117, contact arm 36, contact 8, wire 109, switch arm 43, contact 48, wire 142, bucking coil 51, wire 143, contact 55, switch arm 52, wires 121 and 124, resistance 125 and wire 123, back to the line wire 78. The completion of such circuit causes energization of the bucking coil 51 which neutralizes the action of energizing coil 50 to allow the switch arms 52, 53 and 54 to be moved to the right out of engagement with contacts 55, 56 and 57 and to permit switch arms 52 and 54 to engage contacts 58 and 59. When the bucking coil 51 is so energized in the morning upon the temperature of block 61 rising to its normal value the control of the supply of heat to the block 61 is taken from the morning pick-up resistance 131 and placed in the day resistance 134.

Summarizing the operation of the total system it is seen that with the parts in the position shown, the system is set for night operation. The valve 15 for controlling the supply of fluid to the building is under the control of the inside night thermostat 71 to maintain a predetermined night temperature within the building. During the night period the outdoor controller will cool down sufficiently far to make contact between contacts 67 and 69 and contacts 68 and 70 to energize the relay coil 40 to hold in the relay. Power cannot be supplied to the secondary 115 of the transformer 114 and consequently to the heater 63 of the outdoor controller because the time switch is in the night position. Also during the night the energizing coil 50 is energized to maintain the switch arm 54 in engagement with the contact 57.

At substantially 6 o'clock in the morning the time switch takes the control away from the inside thermostat 71 and places it under the control of the outdoor controller 60. Since the outdoor controller is cold at this time of the morning and since the building is likewise relatively cold, the valve 15 is opened to supply heat to the building and the transformer 114 is energized to supply heat to the outdoor controller 60 under the control of the morning pick-up resistance 131. Heat will be supplied continuously to the building and to the outdoor controller in this manner until the temperature of the outdoor controller becomes normal at which time the relay coil 40 will be deenergized. By correctly proportioning the amount of heat delivered to the outdoor controller 60 and the building, the outdoor controller and building will rise to their normal day temperature values at substantially the same time. When the relay coil 40 is deenergized upon the rise of the outdoor controller temperature to its normal value, the switch arm 42 is moved into engagement with the contact 47 to cause closing movement of the valve 15, and the switch arm 43 is moved out of engagement with the contact 46 and into engagement with the contact 48 to deenergize the transformer 114 and prevent the further supply of heat to the outdoor controller 60. At this same time the bucking coil 51 is energized to neutralize the action of the energizing coil 50, to move the switch arm 54 into engagement with the contact 59 to transfer the control of the heater 63 from the morning pick-up resistance 131 to the day resistance 134.

Supply of heating fluid to the building is now under the normal day control. The temperatures within the controller 60 and within the building will vary in a related manner and when the temperature within the controller drops below the predetermined value the relay coil 40 is energized and pulls in the relay which moves the switch arms 42 and 43 into engagement with the contacts 45 and 46. This will cause opening of the valve 15 to supply heat to the building and will also cause energization of the transformer 114 with the consequent supply of heat to the outdoor controller 60. When the temperature of the outdoor controller 60 rises above the predetermined value, the relay coil 40 is deenergized and the relay falls out to move the switch arms 42 and 43 into engagement with the contacts 47 and 48 which closes the valve 15 to prevent the further supply of the heat to the building and deenergizes the transformer 114 to prevent the further supply of heat to the outdoor controller. During the day the system will cycle in the above manner and maintain the temperature of the building at normal, in accordance with variations in outdoor atmospheric conditions.

At substantially 9 o'clock in the evening the time switch moves the contact arms 35 and 36 out of engagement with contacts 6 and 8 into engagement with the contacts 7 and 9. This takes the control of the heating system away from the outdoor controller and places it under the command of the inside night thermostat 71. Also this causes deenergization of the transformer 114, preventing the supply of heat to the outdoor controller during the night. Further, this causes energization of the energizing coil 50 to place the morning pick-up resistance 131 in command of the heater circuit for the outdoor controller so that sufficient heat will be supplied in the morning to cause morning pick-up when the time switch moves the contact arms 35 and 36 into engagement with the contacts 6 and 8.

This system provides a means whereby the temperature of a building may be maintained at a normal value during the daytime according to outdoor atmospheric conditions and wherein the temperature of the building may be raised to the normal value in the morning in accordance with outdoor temperature conditions.

If it be desirable, the inside night thermostat 71 may be dispensed with and the building temperature allowed to fall in accordance with outside atmospheric conditions. The inside night thermostat 71 is merely used to prevent the temperature of the building from falling too far during severe cold weather conditions.

Although I have disclosed one specific form of my invention I do not wish to be limited thereto since various modifications may become apparent to those skilled in the art; consequently, I intend that my invention should be limited only by the scope of the appended claims and the prior art.

I claim as my invention:

1. In a system of the class described, temperature changing means for a building, an outdoor controller for controlling the temperature changing means to maintain the building temperature at normal, timing means for interrupting the control of the temperature changing means by the outdoor controller to alter the building temperature from normal, and means controlled by said timing means for adjusting the outdoor controller to restore the temperature of the building to normal upon resumption of control of the temperature changing means by the outdoor controller.

2. In a system of the class described, temperature changing means for a building, an outdoor controller for controlling the temperature changing means to maintain the building temperature at normal, means for interrupting the control of the temperature changing means by the outdoor controller to alter the building temperature from normal, means controlled by said interrupting means for adjusting the outdoor controller to restore the temperature of the building to normal upon resumption of control of the temperature changing means by the outdoor controller and for adjusting the outdoor controller to maintain the building temperature at normal after the building temperature has become normal.

3. In a system of the class described, temperature changing means for a building, an outdoor controller for controlling the temperature changing means to maintain the building temperature at normal, means for interrupting the control of the temperature changing means by the outdoor controller to alter the building temperature from normal, and means controlled by the interrupting means and the outdoor controller for adjusting the outdoor controller to restore the temperature of the building to normal and to maintain the building temperature at normal after the building temperature has become normal.

4. In a system of the class described, temperature changing means for a building, an outdoor controller for controlling the temperature changing means to maintain the building temperature at normal, time means for interrupting the control of the temperature changing means by the outdoor controller to alter the building temperature from normal, and means controlled by the time means and the outdoor controller for adjusting the outdoor controller to restore the temperature of the building to normal and to maintain the building temperature at normal after the building temperature has become normal.

5. In a system of the class described, temperature changing means for a building, an outdoor controller for controlling the temperature changing means to maintain the building temperature at normal, time means for interrupting the control of the temperature changing means by the outdoor controller and for restoring the control of the temperature changing means to the outdoor controller, and means controlled by the time means for adjusting the outdoor controller upon resumption of control of the temperature changing means by the outdoor controller to restore the building temperature to normal and for adjusting the outdoor controller when the building temperature is restored to normal for maintaining the building temperature at normal.

6. In a system of the class described, temperature changing means for a building, an outdoor controller comprising temperature changing means and temperature responsive means, the temperature responsive means controlling the operation of both temperature changing means to maintain a normal temperature within the building, means for interrupting the control of the temperature changing means by the temperature responsive means, and means controlled by the interrupting means for adjusting the controller temperature changing means to restore the building temperature to normal upon resumption of control of the temperature changing means by the temperature responsive means.

7. In a system of the class described, temperature changing means for a building, an outdoor controller comprising temperature changing means and temperature responsive means, the temperature responsive means controlling the operation of both temperature changing means to maintain a normal temperature within the building, means for interrupting the control of the temperature changing means by the temperature responsive means, means controlled by the interrupting means for adjusting the controller temperature changing means to restore the building temperature to normal upon resumption of control of the temperature changing means by the temperature responsive means, and means for adjusting the controller heating means to maintain the building temperature at normal after the building temperature has become normal.

8. In a system of the class described, temperature changing means for a building, an outdoor controller comprising temperature changing means and temperature responsive means, the temperature responsive means controlling the operation of both temperature changing means to maintain the building temperature at normal, means for interrupting the control of the temperature changing means by the temperature responsive means to alter the building temperature from normal, and means controlled by the temperature responsive means and the interrupting means for adjusting the controller heating means to restore the temperature of the building to normal and to maintain the building temperature at normal after the building temperature has become normal.

9. In a system of the class described, temperature changing means for a building, an outdoor controller comprising temperature changing means and temperature responsive means, the temperature responsive means controlling the operation of both temperature changing means to maintain the building temperature at normal, time means for interrupting the control of the temperature changing means by the temperature responsive means to alter the building temperature from normal, and means controlled by the time means and the temperature responsive means for adjusting the controller heating means to restore the temperature of the building to normal and to maintain the building temperature at normal after the building temperature has become normal.

10. In a system of the class described, heating means for a building, an outdoor controller comprising heating means for heating the same and thermostatic means responsive to the temperature of the same, the, the thermostatic means controlling both heating means and the controller heating means being adapted to supply different amounts of heat to the controller, means for interrupting the control of the heating means by the thermostatic means to lower the temperature of the building, means controlled by the interrupting means for controlling the controller heating means to supply one amount of heat to the controller upon resumption of control of the heating means by the thermostatic means to raise the temperature of the building to normal and to supply another amount of heat to the controller to maintain the temperature of the building at normal after the building temperature has become normal.

11. In a system of the class described, heating means for a building, an outdoor controller comprising heating means for heating the same and thermostatic means responsive to the temperature of the same, the thermostatic means controlling both heating means and the controller heating means being adapted to supply different amounts of heat to the controller, time means for interrupting the control of the heating means by the thermostatic means to lower the temperature of the building, means controlled by the time means for controlling the controller heating means to supply one amount of heat to the controller upon resumption of control of the heating means by the thermostatic means to raise the temperature of the building to normal and to supply another amount of heat to the controller to maintain the temperature of the building at normal after the building temperature has become normal.

12. In a system of the class described, heating means for a building, an outdoor controller comprising heating means for heating the same and thermostatic means responsive to the temperature of the same, the thermostatic means controlling both heating means and the controller heating means being adapted to supply different amounts of heat to the controller, means interrupting the control of the heating means by the thermostatic means to lower the temperature of the building and the controller, and means operated by the thermostatic means to supply one amount of heat to the controller upon resumption of the control of the heating means by the thermostatic means to raise the controller and building temperatures to normal and supply another amount of heat to the controller when the temperature of the controller has become normal to maintain the building and controller temperatures normal.

13. In a system of the class described, temperature changing means for a building, an outdoor controller for controlling the temperature changing means to maintain a normal temperature within the enclosure, timing means for influencing said controller to cause a different temperature to occur within the enclosure, means controlled by said timing means for adjusting said controller to cause the temperature of the enclosure to be returned to normal, and means actuated when the temperature of the enclosure returns to normal for readjusting said controller to maintain said normal temperature.

14. In a system of the class described, temperature changing means for a building, an outdoor controller for controlling the temperature changing means to maintain a normal temperature within the enclosure, timing means for influencing said controller to cause a different temperature to occur within the enclosure, and means including timing means for adjusting said controller to cause the temperature of the enclosure to be returned to normal and for thereafter readjusting said controller to maintain said normal temperature.

JOHN E. HAINES.